Sept. 6, 1960
S. LENET
2,951,696
AUXILIARY SPRING ATTACHMENT
Filed Oct. 18, 1957
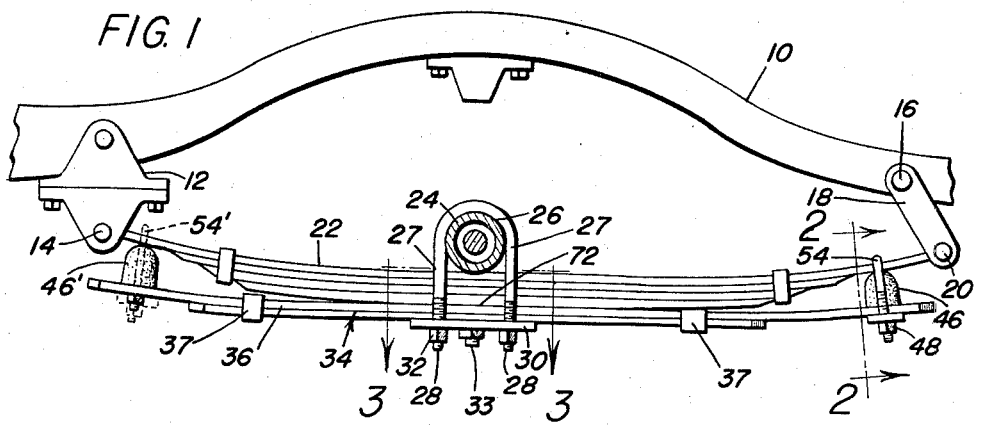
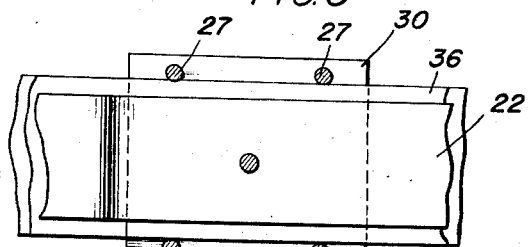
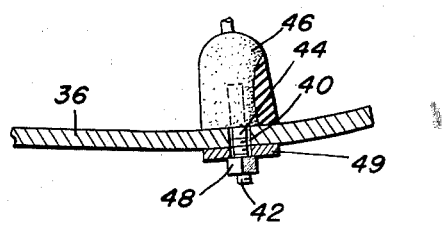
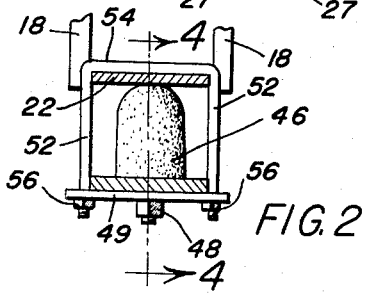
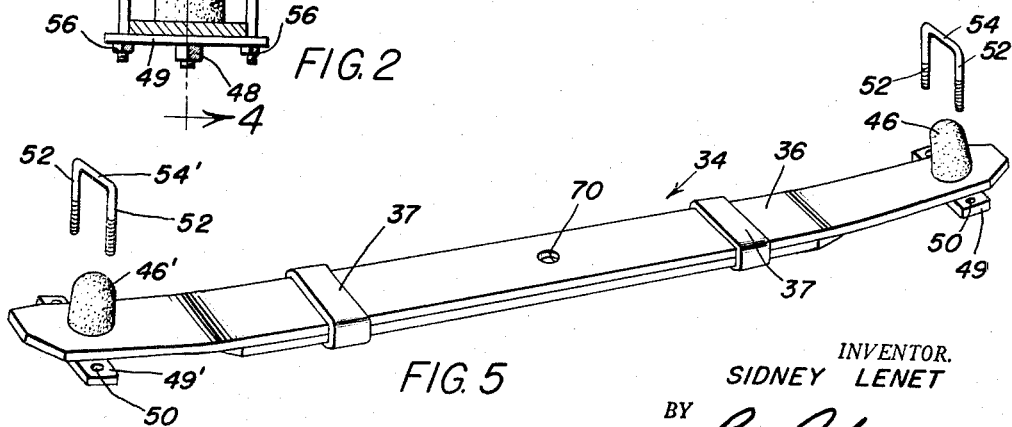
INVENTOR.
SIDNEY LENET
BY
ATTORNEY United States Patent Office 2,951,696
Patented Sept. 6, 1960

2,951,696
AUXILIARY SPRING ATTACHMENT
Sidney Lenet, 6511 Bradford Terrace, Philadelphia, Pa.
Filed Oct. 18, 1957, Ser. No. 691,106
1 Claim. (Cl. 267—45)

This invention relates generally to the spring suspension means for road vehicles, and is more particularly concerned with an improved weight control auxiliary spring for modifying conventional leaf spring suspended vehicle frames for the purpose of controlling the irregular shifting of weight, other than that for which the original spring suspension was designed and additionally to afford smooth and imperceptible transmission of force to the auxiliary weight control spring for the purpose of providing more comfortable and stable vehicle control than was heretofore available.

The utilization of auxiliary weight control devices for a vehicle suspension is basically not new. However, during the transmission of forces from a conventional leaf spring to the auxiliary spring, there was generally encountered a definite perception to the driver of a vehicle as to when the auxiliary spring became effective. The sensation perceived by the driver of a vehicle using conventional auxiliary springs served to distract the driver while controlling the vehicle and additionally impaired the driving qualities of the vehicle.

A primary object of the present invention is to provide an auxiliary weight control spring attachment utilized on a conventional leaf spring assembly absorbing and obviating the perception of the transition stage when the weight control spring becomes effective.

Another object of the invention is to provide an adjustment on one suspension so that the weight can be more evenly distributed by tightening or loosening the clamps, thereby eliminating the hazards of skidding or faulty handling due to uneven weight distribution at various speeds.

A further object of this invention is to provide an auxiliary weight control spring attachment of the character described which includes resilient and compressible shock absorbing means interposed between cooperating end portions of the auxiliary weight control spring, and an adjacent intermediate portion of a leaf spring with which the auxiliary weight control spring cooperates.

A still further object of the invention is to provide an auxiliary weight control leaf spring attachment including means substantially eliminating the tendency of a vehicle to pitch forward or "nose dive," also eliminating excessive side sway, bottoming of the rear of the vehicle and preventing the initially installed leaf spring from "squatting" or flattening out excessively and to prolong the life of the conventional rear leaf spring.

A still further object of the invention is to control the transfer of weight, that is when making a sharp turn to the left, one auxiliary spring will pull downward on the left main spring and the other will push upward on the right main spring which will reduce greatly the angle at which the vehicle will lean to the outside of any curve or corner.

A still further object of the invention is to provide an auxiliary weight control spring attachment which is readily and economically manufactured, easily installed utilizing conventional fastening means comprising a portion of the initial equipment of a spring assembly of a vehicle, and which is practical and desirable for the purpose intended.

Other objects and advantages of this invention will become apparent from a consideration of the following description taken in connection with the accompanying drawing.

In the drawing:

Figure 1 is a fragmentary side elevation of a vehicle suspension, showing an improved auxiliary weight control spring installed, and showing by means of dotted lines retaining means which may be optionally utilized in the installation;

Figure 2 is an enlarged section taken on the line 2—2 of Figure 1;

Figure 3 is an enlarged section taken on line 3—3 of Figure 1;

Figure 4 is a section taken on line 4—4 of Fig. 2, with a portion being broken away and shown in section, and Figure 5 is an enlarged perspective view of the auxiliary spring attachment.

Referring to the drawing in detail, indicated at 10 in a fragmentary portion of an elongated vehicle frame member including at one end a depending mounting bracket 12 supporting a transverse support shaft or pin 14. Extending transversely of the frame member 10 in longitudinally spaced relationship from the bracket 12 is a support shaft or pin 16 pivotally supporting a pair of depending support links 18 extending on opposite sides of the frame member 10 suitably supporting at their lower ends a support pin 20.

Extending longitudinally beneath the frame member 10 is a multiple leaf spring 22, opposite ends of which being pivotally supported on the shafts or pins 14 and 20 facilitating vertical oscillatory movement thereof during travel of the vehicle. The spring 22 is secured to an axle 24 by means of a pair of inverted U-bolts 26 which include legs 27 which extend over the axle 24 in spaced relation on opposite sides of the spring 22. The lower ends of the U-bolts are suitably threaded at 28 extending through suitably apertured clamp plate 30 and being retained thereon by means of nuts 32. The leaves of the multiple leaf 22 are retained in stacked relationship by means of a centrally located transverse nut and bolt assembly 33. The aforementioned structure is conventional.

Indicated generally at 34 is a preferred embodiment of the auxiliary spring assembly including a body member 36 comprising a pair of elongated juxtaposed flat plates constructed from magnesium steel or the like, and retained together by suitable clamps 37 circumposed thereabout. The body member 36 is juxtaposed longitudinally along the bottom of the multiple leaf spring 22 and is engaged by the clamp plate 30. As most clearly seen in Figure 3, the lower leaf of the body member 36 will have the legs 27 of the U-bolts 26 disposed against the edges thereof to prevent relative movement between the spring 22 and the helper spring assembly 34 for facilitating positive secured relationship of the auxiliary spring attachment relative to the multiple leaf spring.

The body member 36 includes adjacent opposite ends in the upper leaf a transverse aperture 40, see Figure 4, and receiving therethrough a threaded stud portion 42 of a mounting stud 44 fixedly secured in depending relationship from the bottom of dome-shaped resilient and compressible shock absorbing elements 46 and 46' constructed from any suitable material. A suitable retaining nut 48 is utilized on the threaded stud portion 42 for removably retaining the shock absorbing element 46 on the body member. The body member 36 has extending transversely of the undersurface of the upper leaf, a mounting plate 49 beneath the rear shock absorbing element 46. The plate 49 accommodates the stud 44 therethrough and includes apertures 50 for receiving therethrough the legs 52 of a retaining member 54 comprising an inverted U-bolt. The U-bolt 54 will overlie the upper surface of the multiple leaf spring 22 and extend on opposite sides thereof with the legs extending through the apertures 50, and suitable retaining nuts 56 are supplied to engage the legs 52 and the undersurface of plate 49. The utilization of a plate 49' and U-bolt 54' on the forward end of the spring is optional and will not have to be used unless considerable "slap" is experienced after the attachment is installed and the vehicle operated.

The body member 36 although shown to include a pair of juxtaposed springs, may comprise a single leaf element depending upon the weight and load capacity of the vehicle.

As indicated at 70, see Figure 5, the body member 36 will include an aperture therethrough of sufficient size to accommodate the retaining nut of the bolt assembly 33 to permit proper installation of the auxiliary attachment.

The attachment is installed as follows:

A conventional shock absorber of the vehicle (not shown) is disconnected from the multiple leaf spring 22. The vehicle is jacked up by its frame until the wheels of the vehicle leave the ground. The nuts 32 are removed to permit removal of the clamp plate 30. The auxiliary spring attachment is secured to the bottom of the multiple leaf spring 22. The U-bolt 54 is secured in place and initial compression is applied to the shock absorbing element 46 to eliminate any "slap" between the auxiliary spring attachment and the multiple spring leaf.

During operation of the vehicle, excessive flexure of the multiple leaf spring 22 will be initially transmitted to the shock absorbing element 46 and subsequently to the resilient body member 36, transition of the force involved being exceptionally smooth and imperceptible to an occupant of the vehicle.

The form of the invention shown is intended to be taken as a preferred example of the same, and various changes in size, shape and arrangement of parts may be made as do not depart from the spirit of the invention or the scope of the appended claim.

What is claimed as new is as follows:

In a vehicle, an elongated frame member, a semi-elliptical leaf spring secured at opposite ends on said frame, said leaf spring curving downwardly from said frame and having oscillatory movement thereon, a support axle extending transversely beneath an intermediate portion beneath said frame and overlying said leaf spring, a pair of inverted U-bolts straddling said axle and including threaded legs depending on opposite sides of said leaf spring, a clamp plate extending beneath said leaf spring and receiving the threaded legs of said U-bolts therethrough, retaining nuts on said bolt legs, an elongated one piece helper spring extending longitudinally beneath and having a greater width than said leaf spring and including a flat central portion juxtaposed between said leaf spring and clamp plate, said bolt legs engaging opposite side edges of said helper spring and orienting the same parallel below said leaf spring, said helper spring including terminal ends disposed inwardly of the terminal ends of said leaf spring and below the same, compressible, shock absorbing elements extending vertically from each end of said helper spring and abuttingly engaged with said leaf spring, said helper spring including a mounting plate disposed transversely beneath one end of said helper spring, and retaining means straddling the leaf spring and one shock absorbing element at said one end of said helper spring and extending through the mounting plate, said retaining means clamping said one end of said helper spring to the leaf spring and compressing said one shock absorbing element thereat, said shock absorbing elements comprising a terminally threaded stud imbedded therein, the stud of said one shock absorbing element extending through and secured to said mounting plate and said one end of said helper spring, the stud of the other shock absorbing element extending through the other end of said helper spring and being secured thereto.

References Cited in the file of this patent

UNITED STATES PATENTS

| | | |
|---|---|---|
| 1,683,075 | Hughes | Sept. 4, 1928 |
| 1,733,364 | Beaumont et al. | Oct. 29, 1929 |
| 1,952,958 | Wilmart | Mar. 27, 1934 |
| 2,201,531 | Geb | May 21, 1940 |
| 2,301,398 | Haynes | Nov. 10, 1942 |
| 2,580,975 | Tea | Jan. 1, 1952 |
| 2,815,945 | Green | Dec. 10, 1957 |

FOREIGN PATENTS

| | | |
|---|---|---|
| 224,378 | Great Britain | Nov. 13, 1924 |